(12) United States Patent
Weisse et al.

(10) Patent No.: US 7,993,105 B2
(45) Date of Patent: Aug. 9, 2011

(54) HOLLOW FAN BLADE FOR GAS TURBINE ENGINE

(75) Inventors: Michael A. Weisse, Tolland, CT (US); William R. Graves, Manchester, CT (US); Stephen Bret Bonarrigo, Avon, CT (US)

(73) Assignee: United Technologies Corporation, Hartford, CT (US)

( * ) Notice: Subject to any disclaimer, the term of this patent is extended or adjusted under 35 U.S.C. 154(b) by 197 days.

(21) Appl. No.: 11/295,335

(22) Filed: Dec. 6, 2005

(65) Prior Publication Data

US 2007/0128042 A1 Jun. 7, 2007

(51) Int. Cl.
*F01D 5/14* (2006.01)

(52) U.S. Cl. .................. 416/232; 416/223 R

(58) Field of Classification Search .................. 416/223, 416/232, 226; 415/169.1; 29/889.72
See application file for complete search history.

(56) References Cited

U.S. PATENT DOCUMENTS

| | | | |
|---|---|---|---|
| 2,644,665 A | 7/1953 | Cangemi | |
| 3,017,159 A | 1/1962 | Foster et al. | |
| 3,533,712 A | 10/1970 | Kercher | |
| 3,628,226 A | 12/1971 | Nelson | |
| 3,678,802 A | 7/1972 | Butter | |
| 4,501,053 A | 2/1985 | Craig et al. | |
| 4,507,051 A | 3/1985 | Lesgourgues et al. | |
| 4,514,144 A | 4/1985 | Lee | |
| 4,574,451 A | 3/1986 | Smashey et al. | |
| 4,606,778 A | 8/1986 | Jahnke | |
| 5,063,662 A | 11/1991 | Porter et al. | |
| 5,246,340 A | 9/1993 | Winstanley et al. | |
| 5,253,824 A | 10/1993 | Halila et al. | |
| 5,269,058 A * | 12/1993 | Wiggs et al. | ............... 29/889.72 |
| 5,516,593 A | 5/1996 | Weisse et al. | |
| 5,536,143 A | 7/1996 | Jacala et al. | |
| 5,957,658 A | 9/1999 | Kasprow et al. | |
| 5,997,251 A | 12/1999 | Lee | |
| 6,099,252 A | 8/2000 | Manning et al. | |
| 6,146,099 A | 11/2000 | Zipps et al. | |

(Continued)

FOREIGN PATENT DOCUMENTS

EP 0468221 1/1992

(Continued)

OTHER PUBLICATIONS

Joe Adams, Tomorrow's Technology Today Pratt & Whitney's Vision for the Future, Nov. 6, 2001, pp. 1-21. (Color Article).

(Continued)

*Primary Examiner* — Ninh H Nguyen
*Assistant Examiner* — Dwayne J White
(74) *Attorney, Agent, or Firm* — Carlson, Gaskey & Olds, P.C.

(57) ABSTRACT

A hollow fan blade for a gas turbine engine provides improved resistance to buckling without adding wall thickness. The hollow fan blade includes a pressure side wall and a suction side wall separated and supported by ribs. In the present invention, each wall segment between each adjacent pair of ribs is straight, not curved. At least some of the adjacent walls segments extend at non-parallel angles relative to one another to form the airfoil shape to the hollow fan blade. The resulting fan blade side walls have faceted surfaces, rather than a continuous smooth, curved surface. The straight wall segments between adjacent ribs can withstand higher compressive forces without buckling. As a result, the wall thickness can be reduced.

16 Claims, 4 Drawing Sheets

U.S. PATENT DOCUMENTS

| | | | |
|---|---|---|---|
| 6,331,217 B1 | 12/2001 | Burke et al. | |
| 6,340,047 B1 | 1/2002 | Frey | |
| 6,398,502 B1 * | 6/2002 | Wobben | 416/228 |
| 6,607,355 B2 | 8/2003 | Cunha et al. | |
| 6,637,186 B1 | 10/2003 | Van Duyn | |
| 6,994,524 B2 | 2/2006 | Owen et al. | |
| 6,994,525 B2 | 2/2006 | Weisse et al. | |
| 7,052,238 B2 | 5/2006 | Whitesell et al. | |
| 7,070,391 B2 | 7/2006 | Weisse | |
| 2005/0160599 A1 | 7/2005 | Palazzini | |
| 2005/0163617 A1 | 7/2005 | Weisse | |
| 2005/0163618 A1 | 7/2005 | Owen | |
| 2005/0163619 A1 | 7/2005 | Weisse | |
| 2005/0163620 A1 | 7/2005 | Whitesell | |

FOREIGN PATENT DOCUMENTS

| | | |
|---|---|---|
| EP | 0 902 165 A2 | 3/1999 |
| EP | 0902165 | 3/1999 |
| GB | 619107 | 3/1949 |
| JP | 58148201 A | 9/1983 |
| JP | 358148301 A | 9/1983 |

OTHER PUBLICATIONS

Adams, Joe. "Tomorrow's Technology Today: Pratt & Whitney's Vision for the Future," Nov. 6, 2001, pp. 1-21.

European Office Action dated Apr. 24, 2006 for European Application No. 05250320.8.

European Search Report dated Dec. 6, 2005 for European Application No. 05250319.0.

European Search Report dated Dec. 1, 2005 for European Application No. 05250321.6.

European Search Report dated Dec. 1, 2005 for European Application No. 05250323.2.

European Search Report dated Dec. 1, 2005 for European Application No. 05250322.4.

* cited by examiner

HOLLOW FAN BLADE FOR GAS TURBINE ENGINE

BACKGROUND OF THE INVENTION

The present invention relates generally to gas turbine engines and more particularly to an improved hollow fan blade for a gas turbine engine.

A gas turbine engine, such as a turbo fan engine for an aircraft, includes a fan section, a compression section, a combustion section and a turbine section. An axis of the engine is centrally disposed within the engine and extends longitudinally through the sections. The primary flow path for working medium gases extends axially through the sections of the engine. A secondary flow path for working medium gases extends parallel to and radially outward of the primary flow path.

The fan section includes a rotor assembly and a stator assembly. The rotor assembly of the fan includes a rotor disc and plurality of radially extending fan blades. The fan blades extend through the flow path and interact with the working medium gases and transfer energy between the fan blades and working medium gases. The stator assembly includes a fan case, which circumscribes the rotor assembly in close proximity to the tips of the fan blades.

During operation, the fan draws the working medium gases, more particularly air, into the engine. The fan raises the pressure of the air drawn along the secondary flow path, thus producing useful thrust. The air drawn along the primary flow path into the compressor section is compressed. The compressed air is channeled to the combustion section where fuel is added to the compressed air and the air/fuel mixture is burned. The products of combustion are discharged to the turbine section. The turbine section extracts work from these products to power the fan and compressed air. Any energy from the products of combustion not needed to drive the fan and compressor contributes to useful thrust.

In order to reduce weight, the fan blades in some gas turbine engines are hollow. Each fan blade is made by combining two separate detail halves. Each half includes a plurality of cavities and ribs machined out to reduce the weight while forming a structurally sound internal configuration. One half forms the pressure side wall and the other half forms the suction side wall. When the detail halves are joined, the pressure side wall and the suction side wall are separated and supported by the ribs to form the hollow fan blade. The hollow fan blade is then subjected to forming operations at extremely high temperatures at which time it is given an airfoil shape and geometry. The side walls are contoured and curved to form the airfoil.

Fan blades must be capable of withstanding the impact of birds, ice or other foreign objects. These apply extreme initial loads at the leading edge, tending to cause bending of the airfoil at the leading edge, which applies a large compressive load to the suction side cavity walls. For this load, spanwise ribs and cavities offer the least resistance to buckling, and it's for this reason that advanced blade configurations feature outer span ribs that run chordwise. There are also secondary loads milliseconds after the impact as a shock wave radiates out from the impact site. These secondary loads flex the metal as they are passed onward. Subsequently, the blade tip will flex back and forth until the energy from the event can be absorbed. These motions alternate compressive and tensile loads to both pressure and suction cavity walls. Blade tips are also subject to circumferential loading when blades rub the case during heavy crosswinds or maneuver loading, or in a severe case, during a blade out event. Tip rubs apply similar compressive loads to the suction side cavity walls.

Compressive loads on the walls between ribs can cause the walls to buckle, depending on the wall thickness and span and other geometry. These considerations increase the minimum wall thickness that must be used. This increases the blade weight, and with hub and containment considerations, the total engine weight.

SUMMARY OF THE INVENTION

The present invention provides a hollow fan blade with improved resistance to buckling without adding wall thickness. The hollow fan blade includes a pressure side wall and a suction side wall separated and supported by ribs. In the present invention, each wall segment between each adjacent pair of ribs is straight, not curved. At least some of the adjacent walls segments extend at non-parallel angles relative to one another to form the airfoil shape to the hollow fan blade.

The resulting fan blade side walls have faceted surfaces, rather than a continuous smooth, curved surface. The straight wall segments between adjacent ribs can withstand higher compressive forces without buckling. As a result, the wall thickness can be reduced.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
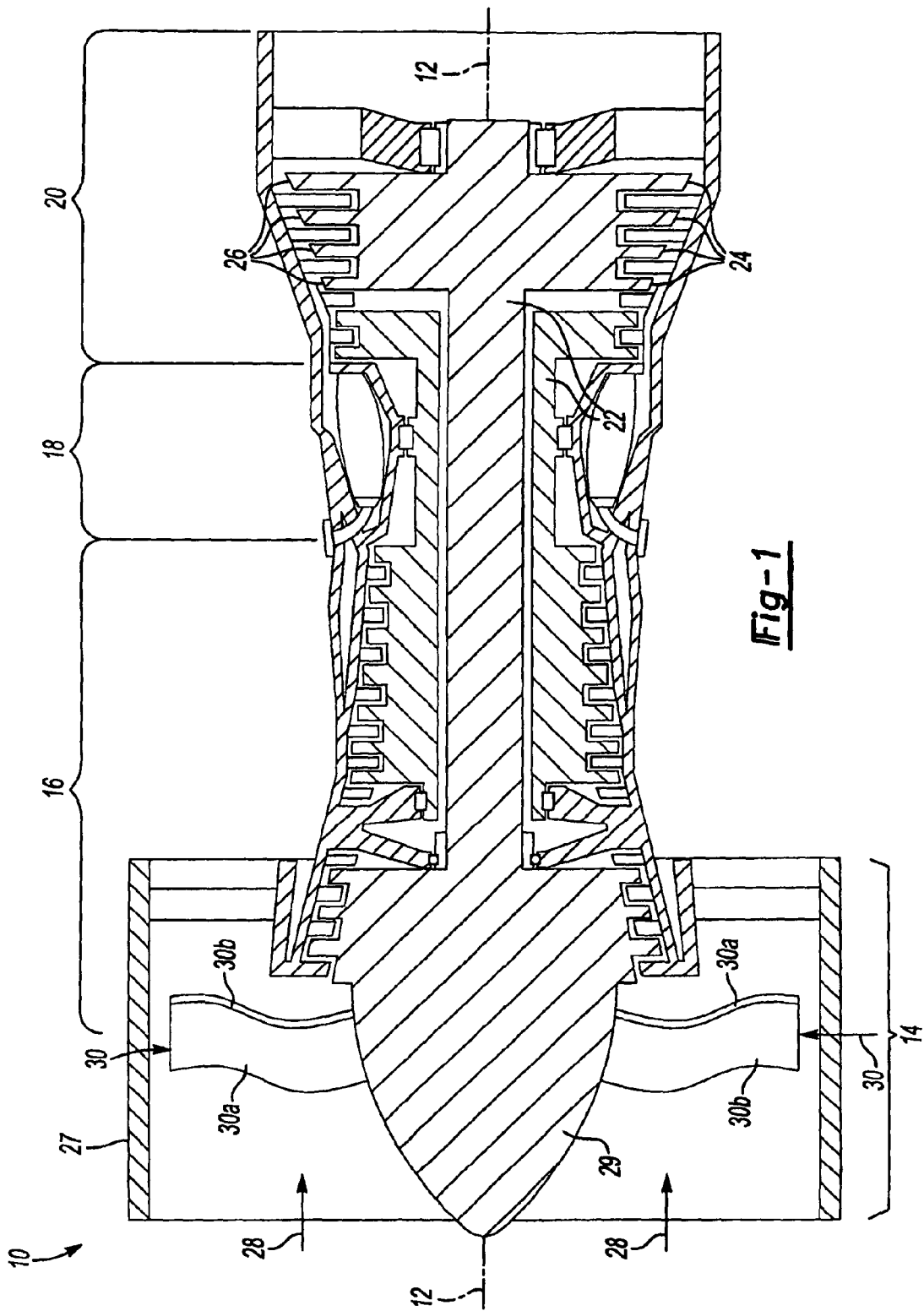
FIG. 1 is a sectional view of an axial flow, turbo fan gas turbine engine with the hollow fan blades of the present invention.

A gas turbine engine 10, such as a turbofan gas turbine engine, circumferentially disposed about an engine centerline, or axial centerline axis 12 is shown. The engine 10 includes a fan 14, a compressor 16, a combustion section 18 and a turbine 20. As is well known in the art, air compressed in the compressor 16 is mixed with fuel, which is burned in the combustion section 18 and expanded in turbine 20. The air compressed in the compressor and the fuel mixture expanded in the turbine 20 can both be referred to as a hot gas stream flow 28. The turbine 20 includes rotors 22 that rotate in response to the expansion, driving the compressor 16 and fan 14. The turbine 20 comprises alternating rows of rotary airfoils or blades 24 and static airfoils or vanes 26.

The fan 14 is surrounded by a fan case 27 and includes a rotor assembly. The rotor assembly includes a rotor disk 29 and a plurality of fan blades 30. Each fan blade 30 extends radially outwardly from the rotor disk 29 across the working medium flow paths into proximity with the fan case 27. The fan blades 30 are hollow fan blades and include a first hollow fan blade detail half 30a and a second hollow fan blade detail half 30b, one forming a pressure side wall and the other forming a suction side wall.

Figure 2:
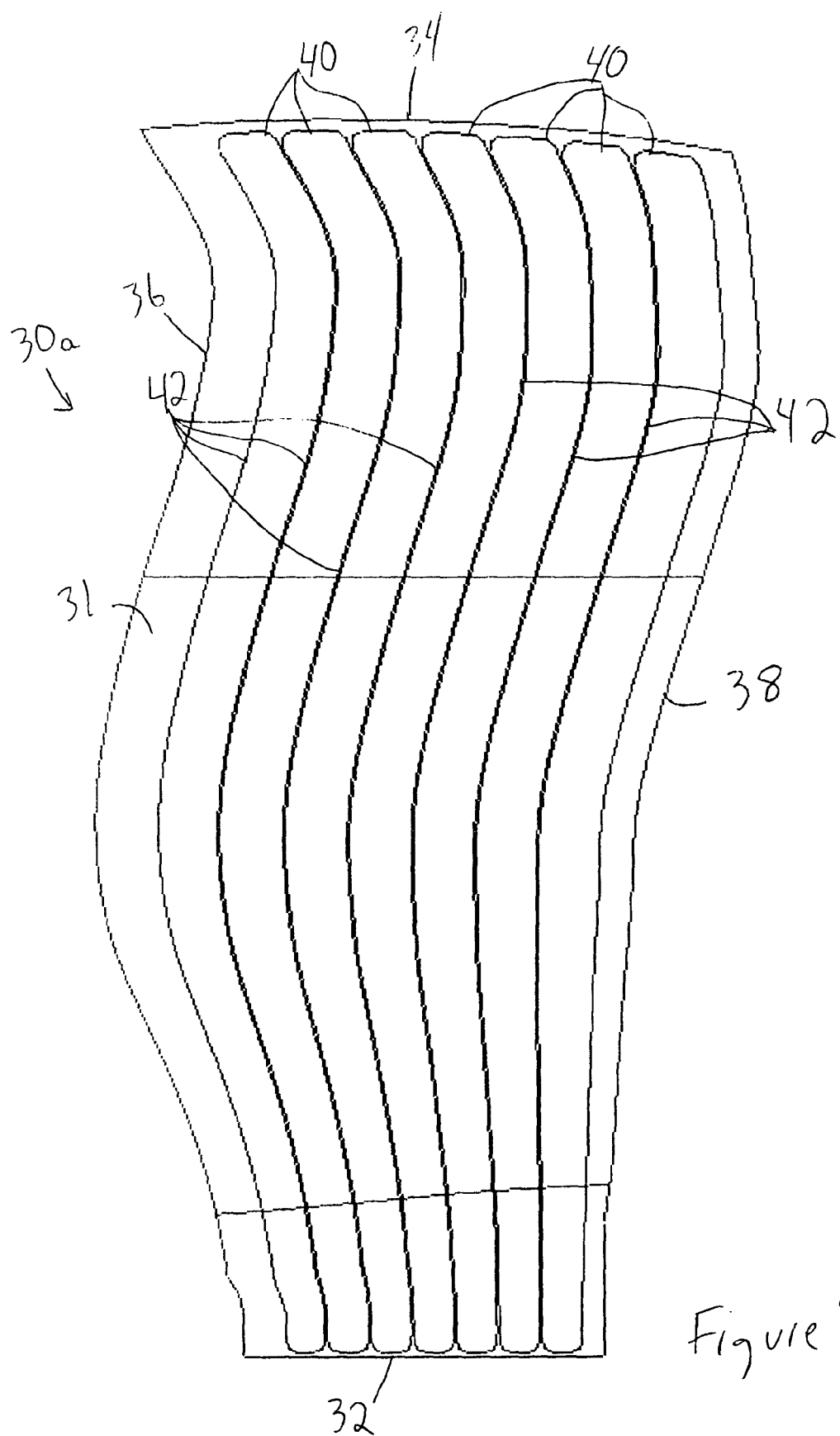
FIG. 2 is a plan view of one detail half of one of the hollow fan blades of FIG. 1.

A first embodiment of one fan blade detail half 30a is shown in FIG. 2. The other fan blade detail half 30b would be complementary. The fan blade detail half 30a comprises a substrate 31, preferably Titanium, having a root edge 32 opposite a tip 34 and a leading edge 36 opposite a trailing edge 38.

In order to reduce weight while still maintaining the necessary stiffness and strength, a plurality of elongated continuous cavities 40 are machined into the interior surface of the substrate 31. The cavities 40 are spaced from one another to form a plurality of continuous, non-intersecting ribs 42. Alternatively (or additionally), the ribs 42 are superplastically formed. The cavities 40 are all formed in the substrate 31 between the root edge 32 and the tip 34, and between the leading edge 36 and trailing edge 38.

The ribs 42 are oriented and biased in order to provide stiffness where needed, both during forming and during use in the turbine engine 10 of FIG. 1. Further, the ribs 42 curve and change direction to eliminate any long, straight cavities 40, which would have low inertia. Preferably, the cavities 40 do not continue in any direction for lengths greater than half the blade chord. Many different arrangements of the cavities 40 and ribs 42 can be used with the present invention, depending upon the particular application. Several such arrangements are disclosed in co-pending, co-owned applications US 2005-0163618A1, 2005-0163620A1, 2005-0160599A1, 2005-0163619A1, 2005-0163617A1 and HOLLOW FAN BLADE FOR GAS TURBINE ENGINE, filed Aug. 15, 2005, Ser. No. 11/203,694, all of which are hereby incorporated by reference in their entirety.

Figure 3:
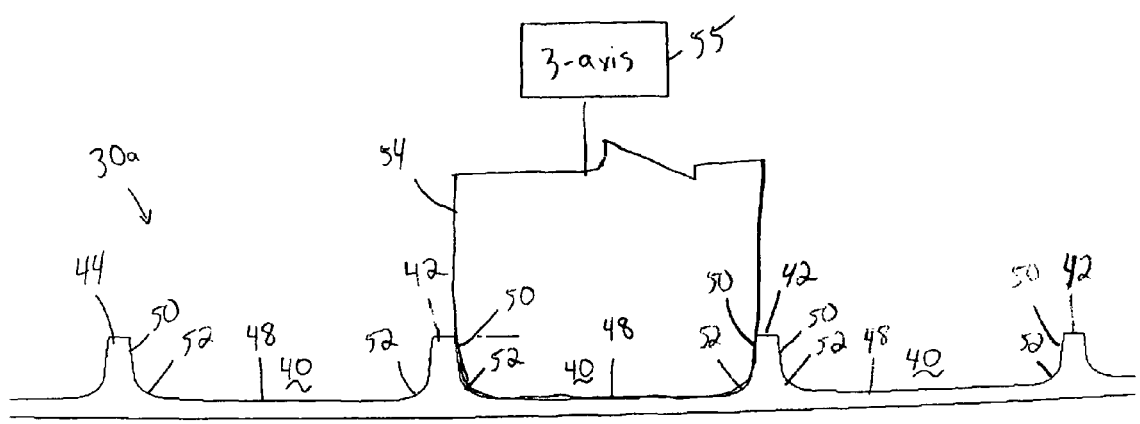
FIG. 3 is a sectional view through three of the cavities of the detail half of FIG. 2 and through a cutter for forming the cavities.

FIG. 3 is a sectional view of the detail half 30a being machined by a cutter 54. The floor of each cavity 40 forms a side wall segment 48 between opposite wall interior surfaces 50, some of which define the ribs 42. Each cavity 40 further includes a radius 52 transition between the wall interior surface 50 and the side wall segment 48. As shown, the side wall segment 48 and both wall interior surfaces 50 are preferably cut simultaneously in a single pass by the cutter 54. Because the cavities 40 are continuous and the ribs 42 do not intersect, each cavity 40 can be formed in a single pass with a single cutter. Alternatively, the cavities 40 may each be formed in a single rough cut and a series of finish cuts, but this is still a significant reduction in the number of cuts and cutters required. Additionally, because the floor has very little curvature prior to forming, the cutter 54 can be operated by a 3-axis machine 55 (shown schematically in FIG. 3), Alternatively, to further reduce machining time it is possible to use a flat external airfoil surface with a curved bond face surface, which permits the cavities to be machined by a 3-axis machine with flat ended milling cutter. In addition, because there are no transversely-extending ribs intersecting the ribs 42 the number of cutters of different diameters required is greatly reduced. A detail half could conceivably be done with a single form cutter, including both rough and finish passes. The other fan blade detail half 30b would be made in a similar manner.

Figure 4:
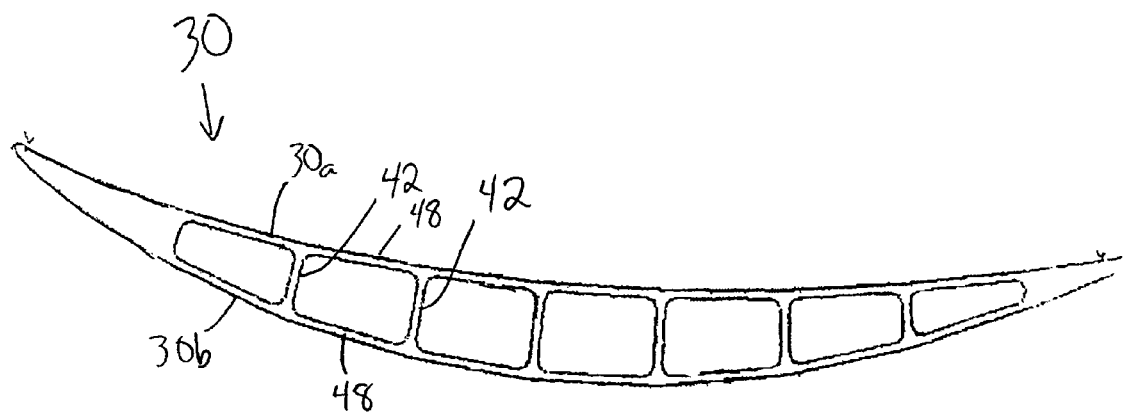
FIG. 4 is a sectional view through an assembled, formed fan blade corresponding to the fan blade detail half of FIG. 2 and its complementary detail half.

FIG. 4 is a sectional view of a portion of the fan blade 30. The ribs 42 of fan blade detail half 30a are aligned and joined with the ribs 42 of the fan blade detail half 30b. After the halves 30a,b are bonded, the fan blade 30 is given an airfoil shape in a forming operation. During the forming operation, the two detail halves are twisted and cambered to the desired shape under high heat. As shown, the side wall segments 48 are straight, even after the forming operation. The side wall segments 48 between each adjacent pair of ribs 42 are maintained straight (or straightened) during the forming operation. In order to form the fan blade 30 into an airfoil, adjacent side wall segments 48 are formed at a non-parallel angle relative to one another. This gives the outer surfaces of the detail halves 30a,b a faceted appearance.

Figure 5:
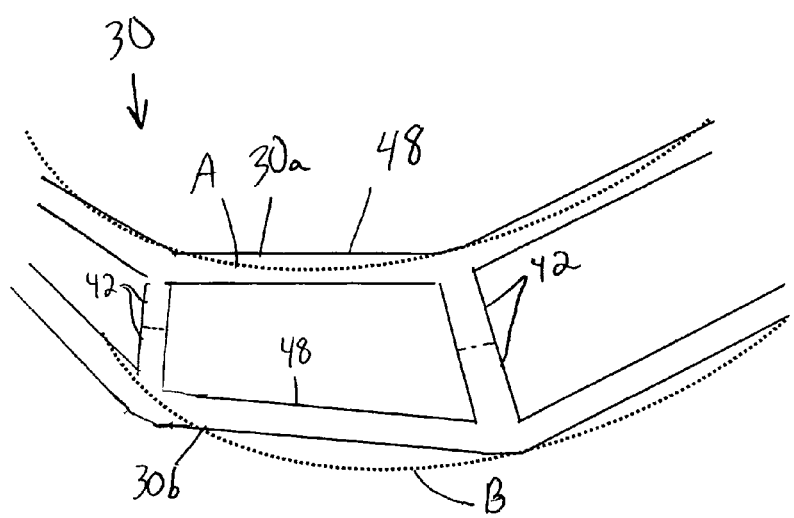
FIG. 5 is a magnified view of portion of FIG. 4

FIG. 5 is an enlarged view of two ribs 42 and of three adjacent side wall segments 48 on each detail half 30a, 30b. The wall segments 48 are straight between the ribs 42, as shown in contrast with prior art continuous curvature outer surfaces A and B, shown in phantom (curvature and angles are exaggerated in FIG. 5 for illustration). Adjacent wall segments 48 extend at non-parallel angles relative to one another in order to follow the curves of the airfoil shape. Also, as can be noted from FIGS. 4 and 5, opposite wall segments 48 (i.e. on opposite detail halves 30a, b and connected between the same pair of joined ribs 42) also may not be parallel to one another as the thickness of the hollow fan blade 30 changes across its width. The sizing will depend upon the required load transitioning and carrying capabilities. Preferably, the ratio of the width w of the cavity at the rib wall fillet run out to the thickness t of the side wall segment 48 should be less than ten, but can be larger if the rib can be aligned more parallel to the load.

The straight wall segments 48 provide better resistance to buckling under compressive loads than the previously-used curved wall segments. Therefore, the thickness of the wall segments 48 can be reduced while maintaining durability. Reducing the thickness of the wall segments 48 can have a significant effect on the total weight of the engine 10 (FIG. 1), by reducing the weight of not just the hollow fan blades 30, but also the required strength of the hub and the fan case 27 which must contain the fan blades 30.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers for steps in the method claims are for ease of reference by dependent claims, and do not indicate a required sequence, unless otherwise indicated.

What is claimed is:

1. A hollow fan blade comprising:
   a pressure side wall having an exterior surface;
   a suction side wall having an exterior surface; and
   a plurality of ribs extending between the pressure side wall and the suction side wall, at least one of the pressure side wall and the suction side wall defining a plurality of straight wall segments between a plurality of adjacent pairs of the plurality of ribs, each of the plurality of straight wall segments forming a facet on an outer surface thereof.

2. The hollow fan blade of claim 1 wherein the plurality of straight wall segments are straight between each adjacent pair of the plurality of ribs.

3. The hollow fan blade of claim 2 wherein adjacent wall segments are not parallel to one another.

4. The hollow fan blade of claim 2 wherein the plurality of ribs are at least partially defined by a plurality of substantially parallel, elongated, continuous cavities formed in at least one of the pressure side wall and the suction side wall.

5. A gas turbine engine including a plurality of the hollow fan blades of claim 1.

6. The hollow fan blade of claim 1 wherein the plurality of ribs are generally parallel to one another.

7. The hollow fan blade of claim 6 wherein the plurality of ribs curves in a first direction and then curve in an opposite second direction.

8. A method for making a hollow fan blade detail half including the steps of:
   a) forming a set of substantially parallel continuous first rib portions on a substrate in a first region, wherein the first rib portions do not intersect one another or any other rib portions;
   b) forming a set of substantially parallel continuous first cavities adjacent each of the first rib portions;
   c) forming a straight wall segment at a bottom of each of the first cavities; and
   d) forming a faceted outer surface on the detail half, the outer surface opposite the plurality of first rib portions.

9. The method of claim 8 wherein said step c) further includes the step of curving the plurality of first rib portions in a first direction and then curving the plurality of first rib portions in an opposite second direction.

10. The method of claim 9 wherein said step c) further includes the step of forming adjacent wall segments at a non-parallel angle relative to one another.

11. A hollow fan blade comprising:
   a pressure side wall having an exterior surface;
   a suction side wall having an exterior surface; and
   a plurality of ribs extending between the pressure side wall and the suction side wall, the exterior surface of at least one of the pressure side wall and the suction side wall having a plurality of facets between at least some adjacent pairs of the plurality of ribs.

12. The hollow fan blade of claim 11 wherein the exterior surface of the at least one of the pressure side wall and the suction side wall includes a facet surface between each adjacent pair of the plurality of ribs.

13. The hollow fan blade of claim 11 wherein the plurality of facets includes a plurality of straight wall segments.

14. The hollow fan blade of claim 11 wherein adjacent facets are not parallel to one another.

15. The hollow fan blade of claim 11 wherein the plurality of ribs are at least partially defined by a plurality of substantially parallel, elongated, continuous cavities formed in at least one of the pressure side wall and the suction side wall.

16. A gas turbine engine including a plurality of the hollow fan blades of claim 15.

* * * * *